Feb. 14, 1967  W. R. MILLS, JR  3,304,424
RADIOACTIVE WELL LOGGING TECHNIQUE FOR
LOGGING FOR THE SODIUM-24 ISOMER
Filed March 21, 1963  2 Sheets-Sheet 2

United States Patent Office 3,304,424
Patented Feb. 14, 1967

3,304,424
RADIOACTIVE WELL LOGGING TECHNIQUE FOR LOGGING FOR THE SODIUM-24 ISOMER
William R. Mills, Jr., Dallas, Tex., assignor to Mobil Oil Corporation, a corporation of New York
Filed Mar. 21, 1963, Ser. No. 266,872
8 Claims. (Cl. 250—71.5)

The present invention relates to radioactive well logging and more particularly to nuclear isomerism logging and has for an object the provision of an improved method of distinguishing between oil and salt water contained within the formations traversed by a borehole.

In the field of radioactive well logging, the differentiation of oil and salt water in the formations has been carried out by looking for chlorine present as sodium chloride in water contained in the formations. Chlorine is detected by measuring the intensity of high energy neutron-capture gamma rays characteristic of those emitted by chlorine. One difficulty with this process is that iron, present in the borehole casing and in the logging tool, also emits high energy neutron-capture gamma rays in the same energy range as those emitted by chlorine. The effect of the iron-capture gamma rays is to obscure and interfere with the measurements of the chlorine-capture gamma rays.

Another approach to the problem of oil-salt water differentiation is to look for sodium in salt water by detecting the 2.75-m.e.v. and 1.38-m.e.v. gamma rays emitted by magnesium-24 following the $\beta^-$ decay of sodium-24 produced by the reaction $Na^{23}(n, \gamma)Na^{24}$. The difficulty with this technique as applied to continuous borehole logging is that the ground state of the isotope sodium-24, which decays by $\beta^-$ emission to magnesium-24, has a half life of about 15 hours. Continuous logging by this process is thus extremely difficult due to the amount of time required.

The present invention is directed to a well logging process for identifying elements in the formations traversed by a borehole by detecting nuclear isomers formed from the elements when irradiated with primary radiation. This process, as applied in the preferred embodiment, provides an improved technique for differentiating between oil and salt-water saturated formations and avoids the above-mentioned logging difficulties encountered.

More particularly and in accordance with the present invention, salt water (sodium chloride dissolved in water) may be distinguished by detecting the gamma rays emitted by the sodium-24 isomer formed from sodium-23 upon the capture of thermal neutrons. When sodium-23 captures a thermal neutron, the isotope sodium-24 is formed in a highly excited state which decays approximately 70% of the time to the first excited state of sodium-24 at 0.47 m.e.v. This energy level is isomeric, having a half life of about 20 milliseconds and decaying to the ground state by the emission of a 0.47-m.e.v. gamma ray. In accordance with the present invention, the presence of sodium is detected to identify salt water by the process which comprises the steps of irradiating the formations with neutrons and obtaining intensity measurements of the 0.47-m.e.v. gamma rays emitted by the sodium-24 isomer. Iron does not interfere with the intensity measurements of the 0.47-m.e.v. gamma rays since the iron-capture gamma rays will not persist beyond a few thermal neutron lifetimes (the order of 1 millisecond), and therefore will not be present when measurements of the 0.47-m.e.v. gamma rays from sodium-24 are recorded. Furthermore, the much higher energy of the iron-capture gamma rays compared to the isomeric radiation inherently results in less interference. In addition, due to the short half life of the sodium-24 isomer, continuous logging operations can be readily carried out.

In accordance with a more specific aspect of the present invention, the formations are irradiated with neutrons for a predetermined time period. After irradiation has ceased, gamma ray intensity measurements at about 0.47-m.e.v. are obtained during a predetermined time period. A function is produced which is representative of the intensity of the 0.47-m.e.v. gamma rays measured. The irradiating and measuring steps are carried out repeatedly in regular succession to obtain a continuous function in correlation with depth which function is representative of the intensity of the 0.47-m.e.v. gamma rays detected.

For further aspects and advantages of the present invention and for a more complete understanding thereof, reference may now be had to the following detailed description taken in conjunction with the accompanying drawings wherein:

FIGURE 3 illustrates traces representative of radiation intensity detected opposite various formations traversed by a borehole;

Figure 1:
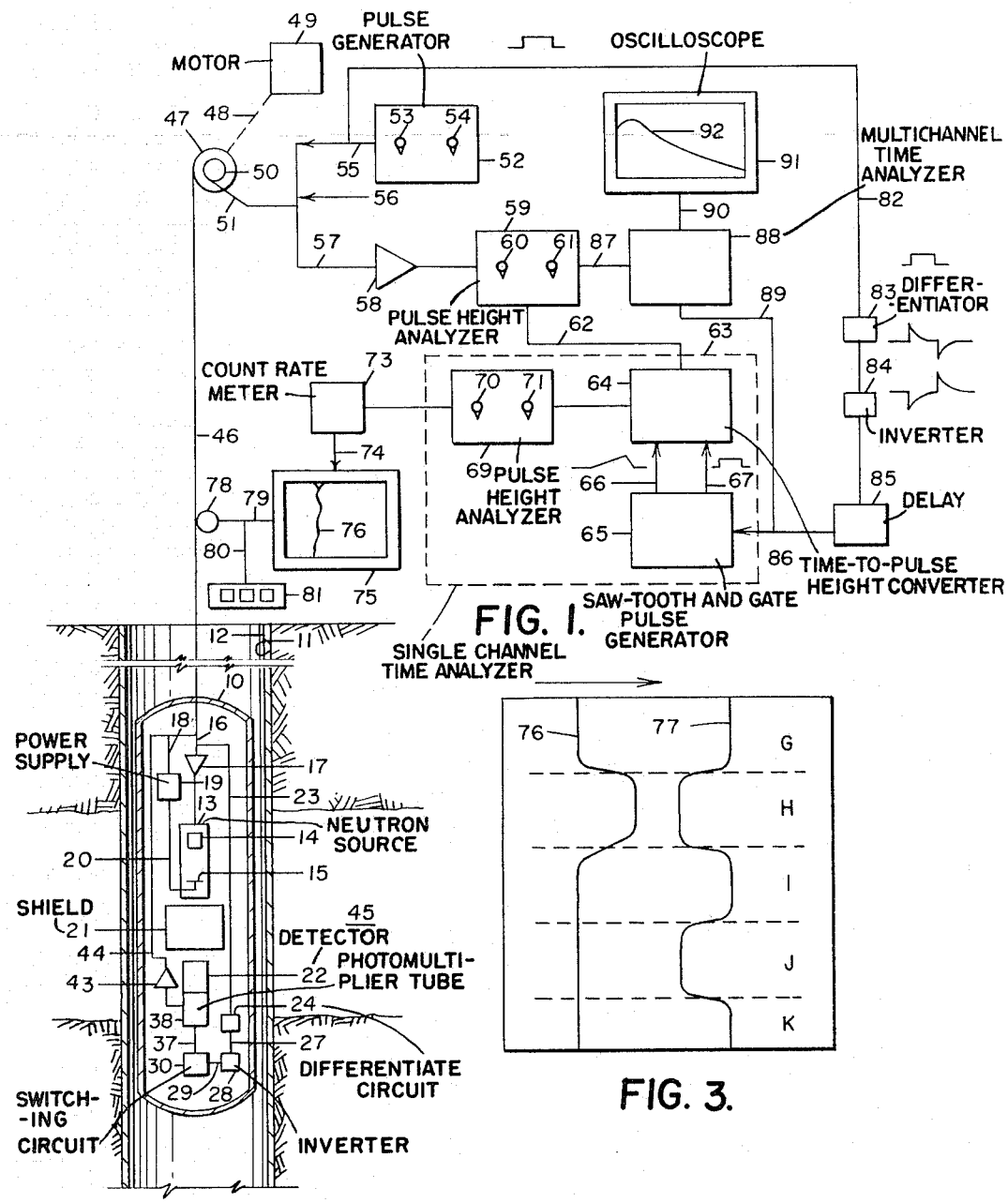
FIGURE 1 illustrates a system for carrying out the radioactive well logging process of the present invention.

Referring now to FIGURE 1 of the drawings, there is disclosed a system for carrying out the radioactive well logging process of the present invention. A radioactive well logging instrument 10 is provided for traversing a borehole 11 which may be lined with an iron casing 12. The logging instrument 10 is supported in the borehole by a cable 46 which is wound and unwound upon a drum 47. A motor 49 drives the drum 47 by way of mechanical connection 48 to move the instrument 10 through the borehole to log for the presence of certain elements of interest which may be in formation 45. The elements of interest are those which when irradiated with primary radiation form isomers which have a characteristic half life and which decay by the emission of secondary radiation having a characteristic energy value.

To determine the presence or absence of these elements, the formations are irradiated with primary radiation and secondary radiation, having energies corresponding to the characteristic energy value, is detected for measurement purposes. The process may be carried out by repetitively irradiating the formations during short time periods with primary radiation from a pulsed radiation source 13. The source 13 may be a pulsed neutron generator which is repetitively actuated for the production of fast neutrons by the deuterium-tritium reaction as will be described hereinafter. Secondary radiation passing from the formations into the borehole is detected by the detector 22 which is shielded from direct radiation emitted from the source 13 by a shield 21. The detector 22 may be a sodium-iodide crystal for detecting gamma rays. A photomultiplier tube 38 is employed for converting the scintillations from the crystal into electrical pulses having magnitudes proportional to the energy of the gamma rays detected.

The photomultiplier tube normally is biased to inoperation and is energized after each burst of irradiation for the measurement of gamma ray intensity as will be described more thoroughly hereinafter. The output of the photomultiplier tube 38 is applied at the surface to a single channel pulse height analyzer 59. This analyzer is adjusted whereby its output is representative of only the intensity of the secondary radiation detected at the energy level which corresponds to the characteristic energy value of the secondary radiation emitted by the isomers of interest. In the detection of sodium, this analyzer is adjusted to be responsive only to gamma rays having energies of about 0.47 m.e.v.

In the preferred embodiment, the output of the analyzer 59 is applied to a continuous recorder 75 for the production of a continuous log 76. The output of the analyzer 59 can be applied also to an oscilloscope 91 for the production of a decay curve 92. In the production of a continuous log, the output of the analyzer 59 is applied to the recorder 75 by way of a single channel time analyzer 63.

In the operation of the system, the time analyzer 63 is adjusted to accept pulses from the pulse height analyzer 59 for only a predetermined short time period at a certain time interval after irradiation has ceased. The output of the time analyzer 63 is integrated by a count rate meter 73, the output of which is applied to the recorder 75. The chart of the recorder 75 is driven in correlation with depth by cable measuring element 78 and mechanical connection 79.

Figure 2:
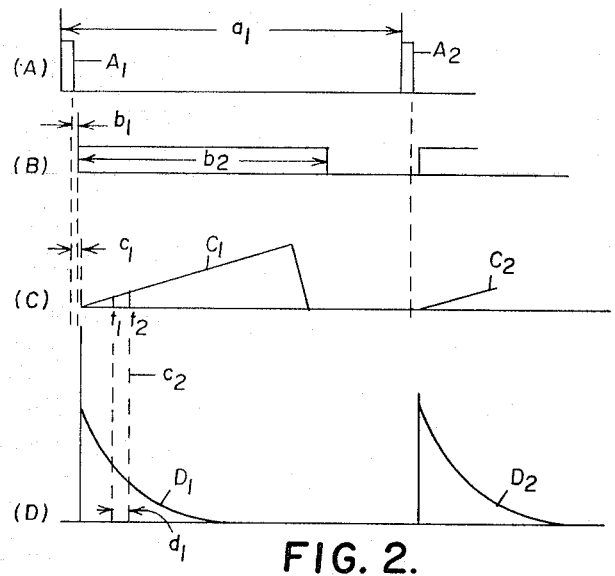
FIGURE 2 illustrates the time during which the formations are irradiated and the time during which intensity measurements of radiation of interest are obtained.

Referring now to FIGURE 2, there will be described more specifically the manner in which the logging process is carried out. The discussion of the process will relate to the identification of sodium; however, it is to be understood that the process can be applied to identify other elements which form isomers when irradiated. The neutron generator may be pulsed for the order of 10 milliseconds repetitively at time intervals preferably greater than 20 milliseconds and which may be of the order of 250 milliseconds. Pulses $A_1$ and $A_2$, shown in FIGURE 2A, represent the output of the neutron generator. The time interval between the beginning of each pulse is represented by $a_1$. After each burst of neutron radiation, and assuming sodium is present in the formations, the decay of the resulting sodium-24 isomers, by the emission of 0.47-m.e.v. gamma rays, is represented by curves $D_1$ and $D_2$ of FIGURE 2D. In the measurement of the intensity of these gamma rays, the photomultiplier tube 38 is energized only during the time period $b_2$ (FIGURE 2B) after each burst of neutrol radiation. Intensity measurements are begun at a time following the end of each burst of neutrol radiation equal to the order of one half life of the 0.47 m.e.v. isomeric energy level of sodium-24. The time during which measurements are made may be of the order of 10 milliseconds and is illustrated at $c_2$ and $d_1$ respectively in FIGURES 2C and 2D. To make these measurements, the single channel time analyzer 63 is adjusted to accept pulses from the pulse height analyzer 59 only during this time period as will be described more thoroughly hereinafter.

Since each irradiation and detection cycle is carried out, at most, in about 250 milliseconds, the logging tool 10 can be moved continuously through the borehole for the production of a continuous log. Moreover, as mentioned above, intensity measurements made at 0.47-m.e.v. are not affected by the neutrol-capture gamma rays emitted from iron. Thus, the detection of salt water by the process of the present invention can be carried out without interference from the iron of the casing usually present in the borehole.

FIGURE 3 illustrates an enlarged showing of the trace 76 which represents the intensity of 0.47-m.e.v. gamma rays detected as the logging tool 10 traverses the various formations G-K. The intensity increases in the direction of the arrow. As can be seen, the trace 76 reflects an increase in gamma ray intensity only opposite formation H, thereby indicating that this formation contains salt water and more particularly sodium. Log 76 also may be used in combination with the porosity log 77 in the search for oil. Log 77 may be an epithermal neutron log obtained by irradiating the formations with fast neutrons and detecting only the epithermal neutrons passing from the formations into the borehole. The intensity decreases reflected by log 77 indicate that formations H and J are porous formations containing either oil or salt water, assuming that the formations are free of fresh water. Since log 76 does not reflect an intensity increase opposite formation J, it can be determined that this formation contains oil.

Referring again to FIGURE 1, there now will be described more particularly the system for carrying out the process. The neutron generator 13 comprises a source 14 of deuterium and a target 15 of tritium. A pulse generator 52 at the earth's surface is provided for periodically pulsing the neutron generator for the production of pulses of neutrons during the logging process. The pulse generator 52 periodically generates trigger pulses of positive polarity which are applied to the deuterium source 14 for ionizing the deuterium. These trigger pulses are applied to the source 14 by way of conductor 55, brush and slip ring arrangement illustrated at 51 and 50, conductor 16 which passes through the cable 46, and pulse amplifier 17. The deuterium ions produced are accelerated to the target 15 by a high negative voltage applied thereto from power supply 19. The reaction between the deuterium ions and the tritium produces neutrons of energy about 14 m.e.v. which then irradiate the adjacent formations. The frequency and duration of the trigger pulses may be controlled respectively by the control dials 53 and 54 of the pulse generator. The power supply 19, coupled to the target 15 by way of conductor 20, is supplied with energizing current from the surface by way of conductor 56, the slip ring and brush arrangement, and conductor 18, passing through the cable 46.

In the detection of isomers formed from elements upon the capture of thermal neutrons, the source 13 and the detector are spaced relatively far apart, for example, about 18 inches. At this distance most of the neutrons which penetrate the formations to the vicinity of the detector will be in the thermal state. Thus, the reactions which take place in the formations opposite the detector predominately will be thermal neutron reactions.

The photomultiplier tube 38 preferably is biased to inoperation and is energized for measurement purposes only after irradiation has ceased. This is done to prevent the gain of the tube from shifting due to the following reason. During irradiation a large number of prompt gamma rays are produced by inelastic scattering of the fast neutrons. These gamma rays produce a high intensity of scintillations in the sodium-iodide crystal which may affect the gain of the tube if it is in an operative condition.

Figure 4:
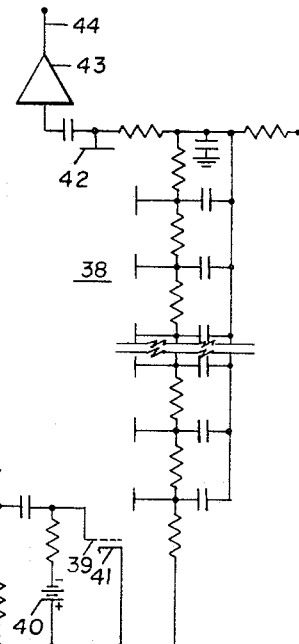
FIGURE 4 represents a system for periodically energizing the photomultiplier tube of the well logging system.

FIGURE 4 illustrates the circuitry of the photomultiplier tube 38 and a switching circuit 30 which may be employed for periodically energizing the photomultiplier tube. Normally, the photomultiplier tube will be biased to inoperation by a negative potential applied to the shield grid 39. This potential is applied by source 40 coupled between the grid 39 and the cathode 41. Switching circuit 30 may comprise a cathode coupled monostable multivibrator including triodes 31 and 32. This circuit is employed for periodically applying a positive pulse to the shield grid 39 to overcome the bias and render the photomultiplier tube in an operative condition. The positive pulse is applied after the end of each burst of irradiation for a certain time period, as now will be described.

Trigger pulses applied downhole from the pulse generator 52 are utilized to trigger periodically the multivibrator 30. These trigger pulses are taken from conductor 16 and applied by way of conductor 23 to an RC differentiating circuit 24, comprising capacitor 25 and resistor 26. The output of this circuit, applied by conductor 27 to the grid of triode 28, is inverted at the plate of triode 28. The output of triode 28 is applied by way of conductor 29 to the grid of tube 31. In the stable state of the multivibrator 30, tube 31 is off and tube 32 is conducting. The trailing positive pulse from the plate of tube 28, when applied to the grid of tube 31, causes this tube to conduct and tube 32 to be cut off. The values of capacitor 33 and resistor 34 may be chosen so that the multivibrator 30 remains in this state for about 150–200 milliseconds before it returns to its stable state. The negative pulses taken from the plate of tube 31 are applied, by way of conductor 35, to the vacuum tube 36 and inverted. The resulting positive pulses at the plate of tube 36 are applied, by way of conductor 37, to the shield grid 39 for rendering the photomultiplier tube in an operative condition.

The photomultiplier tube 38 is energized for the duration of the positive pulse applied to the grid 39, which is of the order of 150–200 milliseconds. This period is illustrated at $b_2$ in FIGURE 2B, as mentioned above. With the system disclosed, intensity measurements can be made substantially at any time during this time period. The photomultiplier tube will not reach an operating condition, however, until about a few microseconds or more after the end of each burst of neutron radiation. This is due in part to the fact that when the positive pulses are applied to the grid of tube 31, the plate of this tube does not drop immediately to its lower level, but is delayed for a time period which may be of the order of about a few microseconds or more. This time interval is sufficient to avoid detecting prompt gamma rays emitted during irradiation and within the order of $10^{-12}$ seconds after the end of irradiation. This delay interval is illustrated at $b_1$ in FIGURE 2B.

Signals taken from anode 42 of photomultiplier tube 38 are applied to amplifier 43 and then to the surface by way of conductor 44 passing through the cable 46. These signals have a magnitude proportional to the energy of the gamma rays detected during the time that the tube 38 is operative. At the surface, signals are taken from conductor 44 by slip ring and brush arrangement 50 and 51. These signals are applied by way of conductor 57 and amplifier 58 to the single channel pulse height analyzer 59 illustrated in FIGURE 1.

The pulse height analyzer 59 is made responsive to the gamma rays detected only within the desired energy range by adjustment of the lower threshold control 60 and the window width control 61. With this adjustment, only the electrical pulses produced by the detected gamma rays of interest will be passed. The output of the analyzer 59 is applied to the single channel time analyzer 63 by way of conductor 62. As mentioned above, this time analyzer is adjusted to be responsive to gamma ray intensity detected only within the time period $c_2$, illustrated in FIGURE 2C.

The time analyzer 63 may comprise a time-to-pulse height converter 64, saw-tooth and gate-pulse generator 65, triggered by pulses applied from pulse generator 52, and single channel pulse height analyzer 69. The saw-tooth generator may be a type 531, Tektronix oscilloscope.

The time-to-pulse height converter 64 is similar to one described in "Time-to-Pulse Height Converter of Wide Range" by Joachim Fischer and Arne Lundby, The Review of Scientific Instruments, volume 31, number 1, January 1960.

In the operation of the time analyzer, a saw-tooth or time-varying voltage from the generator 65 is applied to the converter 64 by way of conductor 66. This saw-tooth voltage is illustrated at $C_1$ and $C_2$ in FIGURE 2C and is generated substantially during the entire period when the photomultiplier tube 38 is operative. The start of the saw-tooth voltage, however, is delayed for a time interval $c_1$, as will be described more thoroughly hereinafter. At the desired instance, the amplitude of the saw-tooth voltage applied to the converter 64 is sampled by sampling pulses, which are those coming from the analyzer 59. As described in the above-mentioned article, a gate is employed for accepting sampling pulses only during the rising part of the saw-tooth voltage. This gate is opened only during this time by a positive pulse applied thereto by way of conductor 67. This positive pulse is available from a (+) gate of the oscilloscope. The output of the converter 64 comprises pulses having magnitudes proportional to that of the saw-tooth voltage at the time of sampling. These output pulses thus have a magnitude proportional to time referred to the start of the saw tooth as time zero. To make the system only responsive to pulses from the pulse height analyzer 59 which appear within the time period $c_2$ between $t_1$ and $t_2$, the pulse height analyzer 69 is adjusted to pass pulses from the converter 64 having a certain magnitude. This adjustment is accomplished by varying the lower threshold control 70 and the window width control 71 of the pulse height analyzer 69. For example, at time $t_1$ (20 milliseconds after the start of the saw tooth) the pulses from converter 64 may be proportional to 40 volts and at time $t_2$ (30 milliseconds after the start of the saw tooth) the pulses from converter 64 may be proportional to 60 volts. The system thus can be made responsive only to pulses which occur between $t_1$ and $t_2$ by adjusting controls 70 and 71 to accept only pulses from converter 64 which have magnitudes proportional to 40–60 volts.

Positive pulses applied from pulse generator 52 are employed to trigger the saw-tooth generator 65. These pulses are applied from pulse generator 52 by way of conductor 82, RC differentiator 83, inverter 84, time delay circuit 85, and conductor 86. The time delay circuit 85 is utilized for delaying the start of the saw-tooth voltage after the photomultiplier tube 38 is first energized following the end of each irradiation burst. This time delay, as an example, may be of the order of several microseconds and is employed to prevent the registering of pulses from the photomultiplier tube due to overshoots which may occur when the potential of the plate circuit of tube 31 drops as this tube becomes conducting. As mentioned above, this delay interval is illustrated as $c_1$ in FIGURE 2C. The time delay circuit 85 may be a screen-coupled phantastron of the type illustrated on page 179 of Time Bases, O. S. Puckle, second edition, 1955, John Wiley and Sons, Inc., New York. The trailing positive pulses applied from inverter 84 are used to trigger circuit 85. The positive output at the screen of the phantastron may be differentiated and the resulting leading positive peak clipped to allow the trailing negative peak to trigger the oscilloscope.

Other pulse height analyzers, single channel time analyzers, and recorders (not shown) also can be employed to make intensity measurements during other time periods after the end of irradiation. For example, measurements may be made at 40 milliseconds as well as 20 milliseconds after the end of irradiation and additionally at a time interval when the gamma ray activity reaches background level. The half life of the radioisotope detected can then be computed, by well-known procedures, from the three measurements obtained as a further check on the presence or absence of sodium.

In another embodiment of the present invention, a multi-channel time analyzer 88 and a readout 91, which may be an X-Y plotter or an oscilloscope, for example, are utilized to obtain a decay curve 92 representative of radiation intensity versus time.

Figure 5:
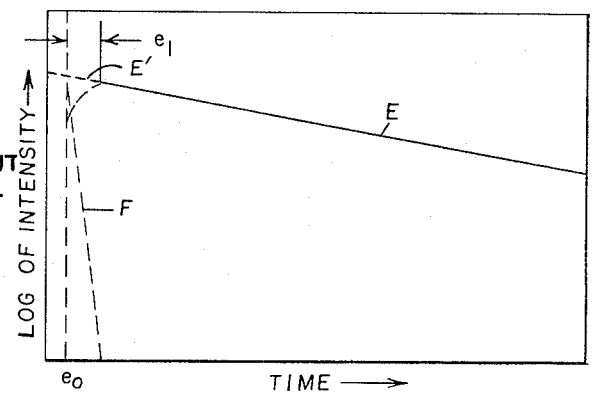
FIGURE 5 illustrates a decay curve useful in understanding the invention.

This curve can be used as a further check on the measurements obtained and to obtain additional information about the conditions of the formations. For example, this curve can be converted to a semilogarithmic plot by plotting the logarithm of the activity against time. Such a plot is shown at E in FIGURE 5. From the asymtotic slope of this curve, the half life can be found. In addition, the relative amount of activity present at the end of bombardment, reflected by the height of the curve E, gives information as to the amount of sodium present.

Curve E additionally can be used to obtain information as to the thermal neutron-capture cross section of the elements in the formations as now will be described. For this purpose, the decay curve is obtained by irradiating the formations for a time period which may correspond with the average lifetime of thermal neutrons in the formations. The curve E illustrated represents 0.47-m.e.v. gamma ray activity detected beginning about 50 microseconds after the end of irradiation. At this time most of the fast neutrons will be slowed to the thermal level. The thermal neutrons formed will diffuse through the formations until they are captured. Due to the presence of these thermal neutrons after bombardment, the 0.47-m.e.v. gamma ray activity will continue to build up for a certain time period. The slope of curve E, at least during build-up, illustrated during time periods $e_1$, thus is dependent upon the thermal neutrons present in the formations. As more thermal neutrons are captured, the rate of build-up will decrease. Curve E is thus a two component curve containing information about the thermal neutrons in the formations and the 0.47-m.e.v. gamma rays emitted by sodium-24. The components of the curve may be separated by well known extrapolation procedures. In the instant case, curve E is extrapolated back to time periods $e_0$ and the curve E is subtracted from the extrapolated portion E' to obtain the resultant curve F. This curve represents the rate of decay or capture of thermal neutrons in the formations. The slope of this curve is dependent upon the capture cross section of the elements in the formations. For example, as the chlorine content of the formations increases, the steepness of the slope of curve F will increase since chlorine has a large capture cross section for thermal neutrons.

To obtain the decay curve 92, the logging instrument 10 is stopped opposite a formation of interest which is repetitively irradiated with bursts of neutrons. The output from the pulse height analyzer 59 is applied to the multichannel time analyzer 88 by way of conductor 87. This analyzer 88 has a plurality of windows each of which sequentially opens and closes to accept pulses from pulse height analyzer 59. The pulses accepted by each window are summed and sequentially applied to the readout 91 by way of conductor 90 for the production of the curve 92. The analyzer 88 is triggered by pulses applied from the delay circuit 85 by way of conductor 89. This circuit may be adjusted to delay the application of trigger pulse to analyzer 88 until about 50 microseconds after the end of irradiation. The depth at which the logging operations are carried out is read from depth meter 81, coupled to the cable measuring element 78 by mechanical connection 80.

In accordance with the present invention, there also may be detected isomers formed from other elements of interest present in the formations traversed by a borehole. Two examples are the isomers formed from magnesium-24 and indium-115. When magnesium-24 is irradiated with fast neutrons, the sodium-24 nucleus may be formed in excited status by the (n,p) reaction as follows:

The 0.47-m.e.v. gamma rays emitted by the isomeric energy level of sodium-24 having half a life of about 20 milliseconds can be detected as described above. In the detection of isomers formed from fast neutron reactions, however, the source 13 and detector 22 are spaced close together to obtain predominately fast neutron reactions in the formations opposite the detector. In the case of magnesium-24, the source 13 and detector 22 may be spaced about 10 inches or less apart.

In the other example, when indium-115 is irradiated with fast neutrons, the indium-114 nucleus may be formed in the excited state by the (n,2n) reaction as follows:

One of the excited states of indium-114 is isomeric having a half life of about 42 milliseconds and decaying by the emission of a 0.32-m.e.v. gamma ray. The intensity of these gamma rays may be measured in the bore hole by adjustment of the pulse height analyzer 59 to be responsive only to 0.32-m.e.v. gamma rays and also by adjusting the time analyzer 63 to obtain measurements preferably at about 42 milliseconds after the end of irradiation.

Figure 6:
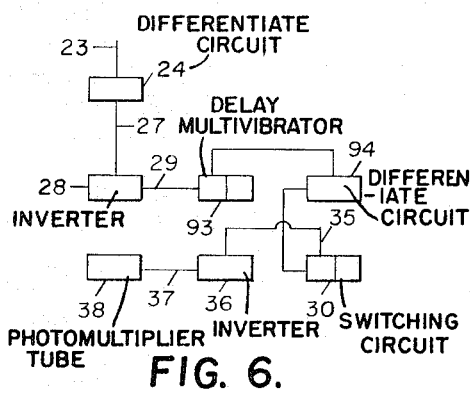
FIGURE 6 illustrates a modified system for periodically energizing the photomultiplier tube.

If it is desired to detect isomers having half lives greater than those described above, the neutron generator 13 can be pulsed at longer intervals and other delay circuits employed to trigger the photomultiplier tube 38 and saw-tooth generator 65. For example, as illustrated in FIGURE 6, the positive pulses from the inverter 28 can be applied to a monostable multivibrator 93, to further delay triggering the photomultiplier tube 38. In the stable state of the multivibrator 93, the left and right tubes respectively are off and conducting. When multivibrator 93 is triggered, the resulting negative pulse taken from the plate of the left tube is differentiated at 94 and the trailing positive pulse from the differentiator 94 is applied to trigger multivibrator 30. Referring to FIGURE 1, the delay circuit 85 can be adjusted for further delay by employing different capacitive and resistive values in the circuit or a multivibrator and differentiator (not shown), similar to that illustrated at 93 and 94, may be coupled between inverter 84 and delay circuit 85 to further delay triggering the saw-tooth generator 65. With the modified system described above, the build up of decay curve 92 may not be obtainable; however, other useful information can be obtained from the curve.

In one embodiment, the saw-toothed generator 65 was of the type manufactured by Tektronix, Inc., Portland, Oregon, type 531. The photomultiplier tube 38 was a Dumont 6292 phototube. The multichannel time analyzer 88 was of the type manufactured by the Technical Measurment Corp., North Haven, Connecticut, model CN–110 which include the plug-in model 214, Multi-Scaler Logic Circuit. The pulse generator 52 (model No. GM–2314–01) and the neutron generator 13 (model No. 285) were of the type manufactured by N. V. Philips' Gloeilampenfabrieken, Eindhoven, Holland, distributed in the U.S. Norelco, 750 South Fulton Avenue, Mount Vernon, New York. The frequency of the trigger pulses produced by the pulse generator 52 may be controlled by an externally applied voltage or by a Wien bridge oscillator included in the system. The frequency of the oscillatory circuit depends on the values of the capacitors and resistors in the bridge. A selector switch, controlled by dial 53, is provided for switching in different capacitors for varying the frequency within a given frequency range. The frequency range desired additionally can be changed by employing capacitors of different values in the bridge circuit as can be understood by those skilled in the art. In one embodiment, the frequency of the trigger pulses was 4 cycles per second, with 250 milliseconds between the beginning of each pulse as described above. The pulse height analyzers 59 and 69 may be of the type manufactured by Baird-Atomic, Cambridge, Massachusetts, model 510.

Having described the invention, it will be understood that modifications may suggest themselves to those skilled in the art, and it is intended to cover all those as fall within the scope of the appended claims.

What is claimed is:

1. The method of logging the formations traversed by a borehole for salt water containing sodium which forms the radioactive isotope sodium-24 upon the capture of thermal neutrons, said radioactive isotope having an isomeric energy level with a characteristic half life of about 20 milliseconds and which decays to the ground state by the emission of gamma radiation of energy of about 0.47 m.e.v., comprising the steps of irradiating the formations with neutrons, detecting gamma radiation emanating from said formations upon the irradiation thereof with neutrons, and selectively measuring the intensity of gamma radiation detected which corresponds to gamma radiation emitted from the isomeric energy level of sodium-24.

2. The method of distinguishing between salt-water, and oil-bearing formations traversed by an iron-cased borehole by logging for sodium which forms the isotope sodium-24 upon the capture of thermal neutrons, said isotope having an isomeric energy level with a characteristic half life of 20 milliseconds and which decays to the ground state by the emission of gamma radiation of energy of about 0.47 m.e.v., comprising the steps of irradiating the formations with bursts of neutrons spaced in time to produce thermal neutrons in the formations for capture by the elements of the formations, between bursts of neutrons detecting gamma radiation emanating from said formations upon the irradiation thereof with neutrons, and producing a function representative predominantly of the intensity of gamma rays detected having energies of about 0.47 m.e.v., to detect for the presence of sodium.

3. The method of claim 2 wherein said last-named function is produced by measuring the intensity of said gamma radiation detected within about 20 milliseconds after the end of each burst of neutrons.

4. The method of claim 2 wherein said last-named function is a continuous function produced in correlation with depth and obtained by successively repeating said irradiating and detecting steps at each of a plurality of locations along said borehole.

5. The method of claim 2 wherein said last-named function is produced by measuring the intensity of said gamma radiation detected at a plurality of time intervals after the end of each burst of neutrons.

6. A method of distinguishing between salt-water- and oil-bearing formations traversed by an iron-cased borehole by logging for sodium which forms the isotope sodium-24 upon the capture of thermal neutrons, said isotope having an isomeric energy level with a half life of about 20 milliseconds and which decays to the ground state by the emission of gamma rays of energy of about 0.47 m.e.v., comprising the steps of:
  irradiating the formations with bursts of neutrons spaced in time to produce thermal neutrons in the formations for capture by the elements of the formations, and between bursts of neutrons sensing for the presence of gamma rays passing from the formations into the borehole and emitted from the isomeric level of sodium-24.

7. A method of distinguishing between salt-water- and oil-bearing formations traversed by an iron-cased borehole by logging for sodium which forms the isotope sodium-24 upon the capture of thermal neutrons, said isotope having an isomeric energy level with a characteristic half life of about 20 milliseconds and which decays to the ground state by the emission of gamma radiation of energy of about 0.47 m.e.v., comprising the steps of:
  cyclically irradiating the formations with bursts of neutrons spaced in time to produce thermal neutrons in the formations for capture by the elements of the formations,
  after each burst of neutrons and at a selected time corresponding to the time of emission of gamma radiation from the isomeric energy level of the isotope sodium-24 detecting gamma radiation passing from the formations into the borehole,
  producing functions representative of the gamma radiation detected,
  selecting from said functions those representative of gamma radiation detected having energies of about 0.47 m.e.v., and
  from said functions selected, producing a function representative of gamma ray intensity.

8. The method of claim 7 wherein the time of each cycle is not greater than about 250 milliseconds,
  said functions selected being representative of gamma rays detected between bursts of neutrons at a time which follows the emission of thermal neutron-capture gamma rays by elements in the formations.

References Cited by the Examiner

UNITED STATES PATENTS

| | | | |
|---|---|---|---|
| 2,463,733 | 3/1949 | Albaugh | 250—83.6 |
| 2,991,364 | 7/1961 | Goodman | 250—83.6 X |
| 2,996,618 | 8/1961 | Goodman et al. | 250—83.6 X |
| 3,090,867 | 5/1963 | Swanson et al. | 250—83.6 X |
| 3,102,956 | 9/1963 | Armistead | 250—83.6 X |

OTHER REFERENCES

Decay of the New Nuclide Ne 24, by Dropesky et al., from Physical Review, vol. 102, No. 2, April 15, 1956, pp. 426 to 433.

Millisecond Half-Life Isomers Produced in Reaction Involving 14-M.e.v. Neutrons, by Glagolev et al., from Soviet Physics J.E.T.P., vol. 36(9), No. 4, October 1959, pp. 742 to 751.

RALPH G. NILSON, *Primary Examiner.*

ARCHIE R. BORCHELT, *Examiner.*